(12) United States Patent
Krebs

(10) Patent No.: US 7,757,234 B2
(45) Date of Patent: Jul. 13, 2010

(54) METHODS AND SOFTWARE FOR A BATCH PROCESSING FRAMEWORK FOR WIZARD-BASED PROCESSES

(75) Inventor: Andreas S. Krebs, Karlsruhe (DE)

(73) Assignee: Sap Aktiengesellschaft, Walldorf (DE)

( * ) Notice: Subject to any disclaimer, the term of this patent is extended or adjusted under 35 U.S.C. 154(b) by 1288 days.

(21) Appl. No.: 11/257,642

(22) Filed: Oct. 24, 2005

(65) Prior Publication Data

US 2007/0101331 A1    May 3, 2007

(51) Int. Cl.
G06F 9/46 (2006.01)
G06F 3/00 (2006.01)

(52) U.S. Cl. .................................... 718/101; 715/700
(58) Field of Classification Search ................ 718/101, 718/100; 715/700
See application file for complete search history.

(56) References Cited

U.S. PATENT DOCUMENTS

| | | | |
|---|---|---|---|
| 5,008,853 A | 4/1991 | Bly et al. | |
| 5,058,043 A * | 10/1991 | Skeirik | 700/167 |
| 5,310,349 A | 5/1994 | Daniels et al. | |
| 5,395,243 A | 3/1995 | Lubin et al. | |
| 5,788,508 A | 8/1998 | Lee et al. | |
| 5,881,315 A | 3/1999 | Cohen | |
| 6,011,949 A | 1/2000 | Shimomukai | |
| 6,014,134 A | 1/2000 | Bell et al. | |
| 6,091,930 A | 7/2000 | Mortimer et al. | |
| 6,099,320 A | 8/2000 | Papadopoulos | |
| 6,112,049 A | 8/2000 | Sonnenfeld | |
| 6,148,338 A | 11/2000 | Lachelt et al. | |
| 6,149,438 A | 11/2000 | Richard et al. | |
| 6,149,441 A | 11/2000 | Pellegrino et al. | |
| 6,162,060 A | 12/2000 | Richard et al. | |
| 6,164,974 A | 12/2000 | Carlile et al. | |
| 6,315,572 B1 | 11/2001 | Owens et al. | |
| 6,336,813 B1 | 1/2002 | Siefert | |
| 6,347,333 B2 | 2/2002 | Eisendrath et al. | |
| 6,347,943 B1 | 2/2002 | Fields et al. | |
| 6,368,110 B1 | 4/2002 | Koenecke et al. | |
| 6,370,355 B1 | 4/2002 | Ceretta et al. | |

(Continued)

FOREIGN PATENT DOCUMENTS

GB   2373625 A   9/2002

OTHER PUBLICATIONS

Dr. D. P. Story; "Intro to Acrobat 5 Batch Processing"; Oct. 20, 2001; Planet PDF <http://www.planetpdf.com/enterprise/article.asp?ContentID=6518>; Accessed Oct. 6, 2009.*

(Continued)

*Primary Examiner*—Meng-Ai An
*Assistant Examiner*—Nikhil Krishnan
(74) *Attorney, Agent, or Firm*—Fish & Richardson, P.C.

(57) ABSTRACT

Disclosed herein are systems and techniques to provide for batch processing of wizards. In general, the techniques may include a computer-implemented method that comprises presenting a wizard to a user to perform a step-by-step process, with each step associated with a step type and the step type being one of confirmation, processing, optional input, or mandatory input. The process is executed as a batch process based on a user request. Then, the batch process is interrupted based on an associated step type of a current step, the interrupting comprising comparing the associated step type to a user parameter.

14 Claims, 7 Drawing Sheets

U.S. PATENT DOCUMENTS

| | | | |
|---|---|---|---|
| 6,381,444 | B1 | 4/2002 | Aggarwal et al. |
| 6,397,036 | B1 | 5/2002 | Thean et al. |
| 6,398,556 | B1 | 6/2002 | Ho et al. |
| 6,470,171 | B1 | 10/2002 | Helmick et al. |
| 6,514,085 | B2 | 2/2003 | Slattery et al. |
| 6,527,556 | B1 | 3/2003 | Koskinen |
| 6,587,668 | B1 | 7/2003 | Miller et al. |
| 6,606,480 | B1 | 8/2003 | L'Allier et al. |
| 6,622,003 | B1 | 9/2003 | Denious et al. |
| 6,633,742 | B1 | 10/2003 | Turner et al. |
| 6,643,493 | B2 | 11/2003 | Kilgore |
| RE38,432 | E | 2/2004 | Fai et al. |
| 6,709,330 | B1 | 3/2004 | Klein et al. |
| 6,717,589 | B1 | 4/2004 | Grillo et al. |
| 6,729,885 | B2 | 5/2004 | Stuppy et al. |
| 6,802,054 | B2 | 10/2004 | Faraj |
| 6,827,578 | B2 | 12/2004 | Krebs et al. |
| 2001/0044728 | A1 | 11/2001 | Freeman et al. |
| 2001/0047310 | A1 | 11/2001 | Russell |
| 2002/0006603 | A1 | 1/2002 | Peterson et al. |
| 2002/0042041 | A1 | 4/2002 | Owens et al. |
| 2002/0061506 | A1 | 5/2002 | Catten et al. |
| 2002/0138841 | A1 | 9/2002 | Ward |
| 2002/0142278 | A1 | 10/2002 | Whitehurst et al. |
| 2002/0174021 | A1 | 11/2002 | Chu et al. |
| 2002/0188583 | A1 | 12/2002 | Rukavina et al. |
| 2003/0013073 | A1 | 1/2003 | Duncan et al. |
| 2003/0043187 | A1 | 3/2003 | Li |
| 2003/0049593 | A1 | 3/2003 | Parmer et al. |
| 2003/0073063 | A1 | 4/2003 | Dattaray et al. |
| 2003/0073065 | A1 | 4/2003 | Riggs |
| 2003/0082508 | A1 | 5/2003 | Barney |
| 2003/0113700 | A1 | 6/2003 | Simon |
| 2003/0129576 | A1 | 7/2003 | Wood et al. |
| 2003/0151629 | A1 | 8/2003 | Krebs et al. |
| 2003/0152899 | A1 | 8/2003 | Krebs et al. |
| 2003/0152900 | A1 | 8/2003 | Krebs et al. |
| 2003/0152901 | A1 | 8/2003 | Altenhofen et al. |
| 2003/0152902 | A1 | 8/2003 | Altenhofen et al. |
| 2003/0152904 | A1 | 8/2003 | Doty, Jr. |
| 2003/0152905 | A1 | 8/2003 | Altenhofen et al. |
| 2003/0157470 | A1 | 8/2003 | Altenhofen et al. |
| 2003/0163784 | A1 | 8/2003 | Daniel et al. |
| 2003/0175664 | A1 | 9/2003 | Frangenheim et al. |
| 2003/0175676 | A1 | 9/2003 | Theilmann et al. |
| 2003/0211447 | A1 | 11/2003 | Diesel et al. |
| 2003/0224339 | A1 | 12/2003 | Jain et al. |
| 2004/0081951 | A1 | 4/2004 | Vigue et al. |
| 2004/0189712 | A1 | 9/2004 | Rundell |
| 2007/0028241 | A1* | 2/2007 | Agiwal .................. 718/101 |
| 2009/0024997 | A1* | 1/2009 | Kobayashi ............. 718/101 |

OTHER PUBLICATIONS

Jean Barkley; "Support of a Non-Modal Software Wizard in a Graphical User Interface"; IP.Com Journal; IP.Com Inc., West Henrietta, NY, US; Sep. 28, 2004; 1 page.

European Search Report issued in corresponding European Application No. 06121517.4; Jul. 9, 2007; 10 pages.

Chappell, David, "Asynchronous Web Services and the Enterprise Service Bus," May 6, 2002, 5 pgs. <http://www.webservices.org>, site visited Dec. 4, 2006.

Siekmann, Jörg et al., "Adaptive Course Generation and Presentation," ITS Workshop on Adaptive and Intelligent Web-Based Foundation System, Montreal, The Omega Group; pp. 1-10, 2000.

Lai Jin et al., "An Ontology-Aware Authoring Tool—Functional structure and guidance generation," Proceedings of AIED '99, pp. 85-92, LeManns France, 1999.

Dietrich, Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 3 pgs., 1997.

Ranwez, Sylvie et al., "Description and Construction of Pedagogical Material using an Ontology based DTD," AIED '99 Workshop 2 proceedings "Ontologies for Intelligent Educational Systems", pp. 1-4, 1999.

Jungmann, Michael et al., "Adaptive Hypertext in Complex Information Spaces," Daimler-Benz Research & Technology, Technical University of Ilmenau, pp. 1-5, Mar. 8, 1997.

Henze, Nicola et al.,"Modeling Constructivist Teaching Functionality and Structure in the KBS Hyperbook System," University of Hannover, pp. 1-12, Jun. 4, 1999.

Mühlhäuser, Max , "Cooperative Computer-Aided Authoring and Learning," University of Karlsruhe, pp. 107-130, 145-161, 165-192, 273-291, 293-318, 1995.

Paaso, Professor Jouko , "A New Environment for Courseware Development, Course Delivery and Training," Proceedings of the ED-Media 97, Toronto, 1997, 10 pages.

Sun Microsystems, "Developing Web Services with SUN™ Open Network Environment," Mar. 2002, [online], [retrieved from the Internet Mar. 24, 2004: http:wwws.sun.com/software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

x.hlp, "Software for faster learning," http://www.xhlp.com/home.cfm, Apr. 2003, 7 pgs.

Global Knowledge Network, Inc., "On Demand Personal Navigator," http://kp.globalknowledge.com/products/od/index.asp, Sep. 2002, 2 pgs.

Hewlett Packard, "HP OpenView Integration Guide for Developers," Jul. 2002, [online], [retrieved from the Internet on Mar. 24, 2004: http://h21007.www2.hp.com/dspp/files/unprotected/OpenView/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

\* cited by examiner

METHODS AND SOFTWARE FOR A BATCH PROCESSING FRAMEWORK FOR WIZARD-BASED PROCESSES

TECHNICAL FIELD

This specification relates to operating wizard-based applications in a batch processing mode.

BACKGROUND

Wizards are generally considered interactive software applications that present a task to a user as a series of logical steps. For example, wizards are commonly used to walk a user through installation of software, content, and other similar logic or data. Many wizard steps may require user input whereas others may not. Such wizards requiring user input are often interspersed between long-lasting steps which require none. This requires a user to wait—sometimes hours—for a particular non-interactive step to complete before further input can be provided in a subsequent step.

SUMMARY

This disclosure generally describes systems, methods, and software for operating wizard-based applications in a batch processing mode. For example, a computer-implemented method may comprise presenting a wizard to a user to perform a step-by-step process, with each step associated with a step type and the step type being one of confirmation, processing, optional input, or mandatory input. The process is executed as a batch process based on a user request. Then, the batch process is interrupted based on an associated step type of a current step, the interrupting comprising comparing the associated step type to a user parameter.

The details of one or more embodiments are set forth in the accompanying drawings and the description below. Features, aspects, and advantages will be apparent from the description, drawings, and claims.

DETAILED DESCRIPTION

Figure 1:
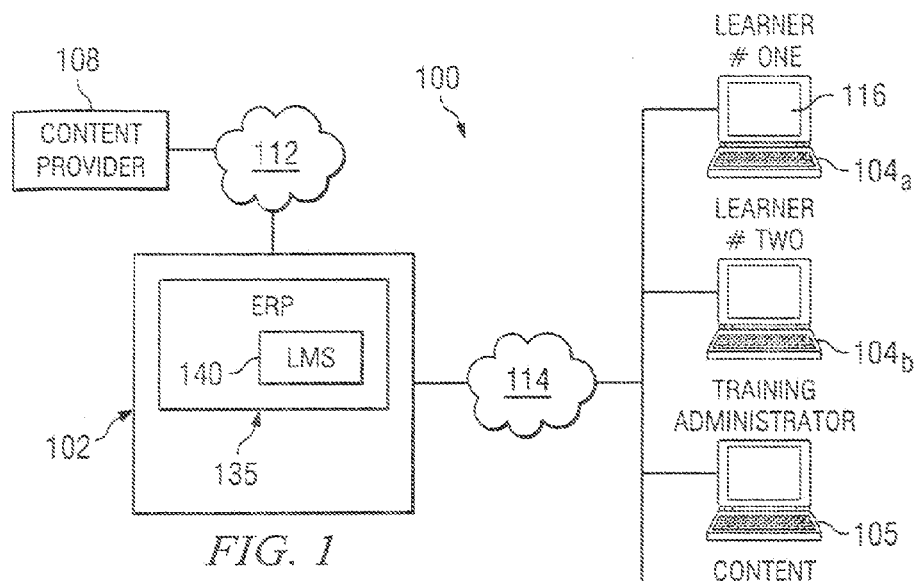
FIG. 1 is a diagram illustrating an example learning environment according to one embodiment of the present disclosure.

FIG. 1 illustrates an example environment for a learning management system 140 that may deliver a blended learning solution of learning methods used in traditional classroom training, web-based training, and virtual classrooms. At a high level, such applications 140 provide convenient information on the learner 104's virtual workplace and at least partially control the learning process itself. The system proposes learning units based on the learner 104's personal data, tracks progress through courses and coordinates the personalized learning experience. In addition, learning management system 140 encompasses the administrative side of the learning platform, where a training administrator 105 structures and updates the offering and distributes it among the target groups. Moreover, the course offering is usually not restricted to internally hosted content. The learning management system 140 often offers robust reporting capabilities, including ad hoc reporting and business intelligence. These capabilities may provide in-depth analysis of the entire business or organization, thereby enabling better decision making. Learning management system 140 typically helps improve the quality of training and cut costs by reducing the travel and administrative costs associated with classroom training while delivering a consistent learning offering. Training administrators 105 may customize teaching scenarios by using web services to integrate external content, functions, and services into the learning platform from a remote or third party content provider 108.

The training administrator 105 can administer internal and external participants (or learners 104) and enroll them for courses to be delivered via any number of techniques. Training management supports the respective organization, entity, or learner 104 in the day-to-day activities associated with course bookings. Booking activities can be performed by the training administrator in training management on an individual or group participant basis. For example, training administrator 105 can often request, execute, or otherwise manage the following activities in a dynamic participation menu presented in learning management system 140: i) prebook: if participants are interested in taking certain classroom courses or virtual classroom sessions, but there are no suitable dates scheduled, learners 104 can be prebooked for the course types. Prebooking data can be used to support a demand planning process; ii) book: individual or group learners 104 (for example, companies, departments, roles, or other organizational units) can be enrolled for courses that can be delivered using many technologies; iii) rebook: learners 104 can book a course on an earlier or later date than originally booked; iv) replace: learners 104 can be swapped; and v) cancel: course bookings can be canceled, for example, if the learners 104 cannot attend.

Environment 100 is typically a distributed client/server system that spans one or more networks such as external network 112 or internal network 114. In such embodiments, data may be communicated or stored in an encrypted format such as, for example, using the RSA, WEP, or DES encryption algorithms. But environment 100 may be in a dedicated enterprise environment—across a local area network or subnet—or any other suitable environment without departing from the scope of this disclosure. Indeed, while generally described or referenced in terms of an enterprise, the components and techniques may be implemented in any suitable environment, organization, entity, and such. Turning to the illustrated embodiment, environment 100 includes or is communicably coupled with server 102, one or more learners 104 or other users on clients, and network 112. In this embodiment, environment 100 is also communicably coupled with external content provider 108.

Server 102 comprises an electronic computing device operable to receive, transmit, process and store data associated with environment 100. Generally, FIG. 1 provides merely one example of computers that may be used with the disclosure. Each computer is generally intended to encompass any suitable processing device. For example, although FIG. 1 illustrates one server 102 that may be used with the disclosure, environment 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server. Server 102 may also be communicably coupled with a remote repository over a portion of network 112. While not illustrated, the repository may be any intra-enterprise, inter-enterprise, regional, nationwide, or other electronic storage facility, data processing center, or archive that allows for one or a plurality of clients (as well as servers 102) to dynamically store data elements, which may include any business, enterprise, application or other transaction data. For example, the repository may be a central database communicably coupled with one or more servers 102 and clients via a virtual private network (VPN), SSH (Secure Shell) tunnel, or other secure network connection. This repository may be physically or logically located at any appropriate location including in one of the example enterprises or off-shore, so long as it remains operable to store information associated with environment 100 and communicate such data to at least a subset of plurality of the clients (perhaps via server 102).

As a possible supplement to or as a portion of this repository, server 102 normally includes some form of local memory. The memory may include any memory or database module and may take the form of volatile or non-volatile memory including, without limitation, magnetic media, optical media, random access memory (RAM), read-only memory (ROM), removable media, or any other suitable local or remote memory component. For example, the memory may store or reference a large volume of information relevant to the planning, management, and follow-up of courses or other content. This example data includes information on i) course details, such as catalog information, dates, prices, capacity, time schedules, assignment of course content, and completion times; ii) personnel resources, such as trainers who are qualified to hold courses; iii) room details, such as addresses, capacity, and equipment; and iv) participant data for internal and external participants. The memory may also include any other appropriate data such as VPN applications or services, firewall policies, a security or access log, print or other reporting files, HTML files or templates, data classes or object interfaces, child software applications or sub-systems, and others. In some embodiments, the memory may store information as one or more tables in a relational database described in terms of SQL statements or scripts. In another embodiment, the memory may store information as various data structures in text files, extensible Markup Language (XML) documents, Virtual Storage Access Method (VSAM) files, flat files, Btrieve files, comma-separated-value (CSV) files, internal variables, or one or more libraries. But any stored information may comprise one table or file or a plurality of tables or files stored on one computer or across a plurality of computers in any appropriate format. Indeed, some or all of the learning or content data may be local or remote without departing from the scope of this disclosure and store any type of appropriate data.

Server 102 also includes one or more processors. Each processor executes instructions and manipulates data to perform the operations of server 102 such as, for example, a central processing unit (CPU), a blade, an application specific integrated circuit (ASIC), or a field-programmable gate array (FPGA). Although this disclosure typically discusses computers in terms of a single processor, multiple processors may be used according to particular needs and reference to one processor is meant to include multiple processors where applicable. In the illustrated embodiment, the processor executes enterprise resource planning (ERP) solution 135, thereby providing organizations with the strategic insight, ability to differentiate, increased productivity, and flexibility they need to succeed. With software such as ERP solution 135, the implementing entity may automate end-to-end processes and extend those processes beyond the particular organization to the entire system by incorporating customers, partners, suppliers, or other entities. For example, ERP solution 135 may include or implement easy-to-use self-services and role-based access to information and services for certain users, thereby possibly boosting productivity and efficiency. In another example, ERP solution 135 may include or implement analytics that enable the particular entity or user to evaluate performance and analyze operations, workforce, and financials on an entity and individual level for strategic and operational insight. ERP solution 135 may further include or implement i) financials to control corporate finance functions while providing support for compliance to rigorous regulatory mandates; ii) operations to support end-to-end logistics for complete business cycles and capabilities that improve product quality, costs, and time to market; and/or iii) corporate services to optimize both centralized and decentralized services for managing real estate, project portfolios, business travel, environment, health and safety, and quality. In the illustrated embodiment, ERP solution 135 also includes or implements some form of human capital management (in this case, learning) to maximize the profitability or other measurable potential of the users, with support for talent management, workforce deployment, and workforce process management. In certain cases, ERP solution 135 may be a composite application that includes, execute, or otherwise implement some or all of the foregoing aspects, which include learning management system 140 as illustrated.

As briefly described above, learning management system 140 is any software operable to provide a comprehensive enterprise learning platform capable of managing and integrating business and learning processes and supporting all methods of learning, not restricted to e-learning or classroom training. As described in more detail in FIG. 2, learning management system 140 is often fully integrated with ERP solution 135 and includes an intuitive learning portal and a powerful training and learning management system, as well as content authoring, structuring, and management capabilities. Learning management system 140 offers back-office functionality for competency management and comprehensive assessment for performance management, and offers strong analytical capabilities, including support for ad hoc reporting. The solution uses a comprehensive learning approach to deliver knowledge to all stakeholders, and tailors learning paths to an individual's educational needs and personal learning style. Interactive learning units can be created with a training simulation tool that is also available.

Regardless of the particular implementation, "software" may include software, firmware, wired or programmed hardware, or any combination thereof as appropriate. Indeed, ERP solution 135 may be written or described in any appropriate computer language including C, C++, Java, J#, Visual Basic, assembler, Perl, any suitable version of 4GL, as well as others. For example, returning to the above described composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while ERP solution 135 is illustrated in FIG. 1 as including one sub-module learning management system 140, ERP solution 135 may include numerous other sub-modules or may instead be a single multi-tasked module that implements the various features and functionality through various objects, methods, or other processes. Further, while illustrated as internal to server 102, one or more processes associated with ERP solution 135 may be stored, referenced, or executed remotely. For example, a portion of ERP solution 135 may be a web service that is remotely called, while another portion of ERP solution 135 may be an interface object bundled for processing at the remote client. Moreover, ERP solution 135 and/or learning management system 140 may be a child or sub-module of another software module or enterprise application (not illustrated) without departing from the scope of this disclosure.

Server 102 may also include an interface for communicating with other computer systems, such as the clients, over networks, such as 112 or 114, in a client-server or other distributed environment. In certain embodiments, server 102 receives data from internal or external senders through the interface for storage in the memory and/or processing by the processor. Generally, the interface comprises logic encoded in software and/or hardware in a suitable combination and operable to communicate with networks 112 or 114. More specifically, the interface may comprise software supporting one or more communications protocols associated with communications network 112 or hardware operable to communicate physical signals.

Network 112 facilitates wireless or wireline communication between computer server 102 and any other local or remote computers, such as clients. Network 112, as well as network 114, facilitates wireless or wireline communication between computer server 102 and any other local or remote computer, such as local or remote clients or a remote content provider 108. While the following is a description of network 112, the description may also apply to network 114, where appropriate. For example, while illustrated as separate networks, network 112 and network 114 may be a continuous network logically divided into various sub-nets or virtual networks without departing from the scope of this disclosure. In some embodiments, network 112 includes access points that are responsible for brokering exchange of information between the clients. As discussed above, access points may comprise conventional access points, wireless security gateways, bridges, wireless switches, sensors, or any other suitable device operable to receive and/or transmit wireless signals. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or 30 systems at one or more locations. Turning to network 114, as illustrated, it may be all or a portion of an enterprise or secured network. In another example, network 114 may be a VPN between server 102 and a particular client across wireline or wireless links. In certain embodiments, network 114 may be a secure network associated with the enterprise and certain local or remote clients.

Each client is any computing device operable to connect or communicate with server 102 or other portions of the network using any communication link. At a high level, each client includes or executes at least GUI 116 and comprises an electronic computing device operable to receive, transmit, process and store any appropriate data associated with environment 100. It will be understood that there may be any number of clients communicably coupled to server 102. Further, "client" and "learner," "administrator," "developer" and "user" may be used interchangeably as appropriate without departing from the scope of this disclosure. Moreover, for ease of illustration, each client is described in terms of being used by one user. But this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device or computer. For example, the client may be a PDA operable to wirelessly connect with external or unsecured network. In another example, the client may comprise a laptop that includes an input device, such as a keypad, touch screen, mouse, or other device that can accept information, and an output device that conveys information associated with the operation of server 102 or other clients, including digital data, visual information, or GUI 116. Both the input device and output device may include fixed or removable storage media such as a magnetic computer disk, CD-ROM, or other suitable media to both receive input from and provide output to users of the clients through the display, namely the client portion of GUI or application interface 116.

GUI 116 comprises a graphical user interface operable to allow the user of the client to interface with at least a portion of environment 100 for any suitable purpose, such as viewing application or other transaction data. Generally, GUI 116 provides the particular user with an efficient and user-friendly presentation of data provided by or communicated within environment 100. As shown in later FIGS, GUI 116 may comprise a plurality of customizable frames or views having interactive fields, pull-down lists, and buttons operated by the user. GUI 116 may be a learning interface allowing the user or learner 104 to search a course catalog, book and cancel course participation, and support individual course planning (e.g., by determining qualification deficits and displaying a learner's completed, started, and planned training activities). Learner 104 also may access and work through web based courses using the learning interface. The learning interface may be used to start a course, reenter a course, exit a course, and take tests. The learning interface also provides messages, notes, and special course offerings to the learner 104. GUI 116 may also be a course editor allowing the content developer to create the structure for the course content, which may be associated with certain metadata. The metadata may be interpreted by a content player of learning management system 140 (described below) to present a course to learner 104 according to a learning strategy selected at run time. In particular, the course editor may enable the author or content developer 106 to classify and describe structural elements, assign attributes to structural elements, assign relations between structural elements, and build a subject-taxonomic course structure. The course editor generates the structure of the course and may include a menu bar, a button bar, a course overview, a dialog box, and work space. The menu bar may include various drop-down menus, such as, for example, file, edit, tools, options, and help. The drop-down menus may include functions, such as create a new course, open an existing course, edit a course, or save a course. The button bar may include a number of buttons. The buttons may be shortcuts to functions in the drop down menus that are used frequently and that activate tools and functions for use with the course editor. The remaining portions of the example course editor interface may be divided in to three primary sections or windows: a course overview, a dialog box, and a workspace. Each of the sections may be provided with horizontal or vertical scroll bars or other means allowing the windows to be sized to fit on different displays while providing access to elements that may not appear in the window.

GUI 116 may also present a plurality of portals or dashboards. For example, GUI 116 may display a portal that allows users to view, create, and manage historical and real-time reports including role-based reporting and such. Generally, historical reports provide critical information on what has happened including static or canned reports that require no input from the user and dynamic reports that quickly gather run-time information to generate the report. Of course, reports may be in any appropriate output format including PDF, HTML, and printable text. Real-time dashboards often provide table and graph information on the current state of the data, which may be supplemented by presentation elements 140. GUI 116 is often configurable, supporting a combination of tables and graphs (bar, line, pie, status dials, etc.), and is able to build real-time dashboards, where presentation elements 140 (as well the displayed application or transaction data) may be relocated, resized, and such. It should be understood that the term graphical user interface may be used in the singular or in the plural to describe one or more graphical user interfaces and each of the displays of a particular graphical user interface. Indeed, reference to GUI 116 may indicate a reference to the front-end or other component of learning management system 140, as well as the particular interface or learning portal accessible via the client, as appropriate, without departing from the scope of this disclosure. In short, GUI 116 contemplates any graphical user interface, such as a generic web browser or touch screen, that processes information in environment 100 and efficiently presents the results to the user. Server 102 can accept data from the client via the web browser (e.g., Microsoft Internet Explorer or Netscape Navigator) and return the appropriate HTML or XML responses to the browser using network 112 or 114, such as those illustrated in subsequent FIGs.

Figure 2:
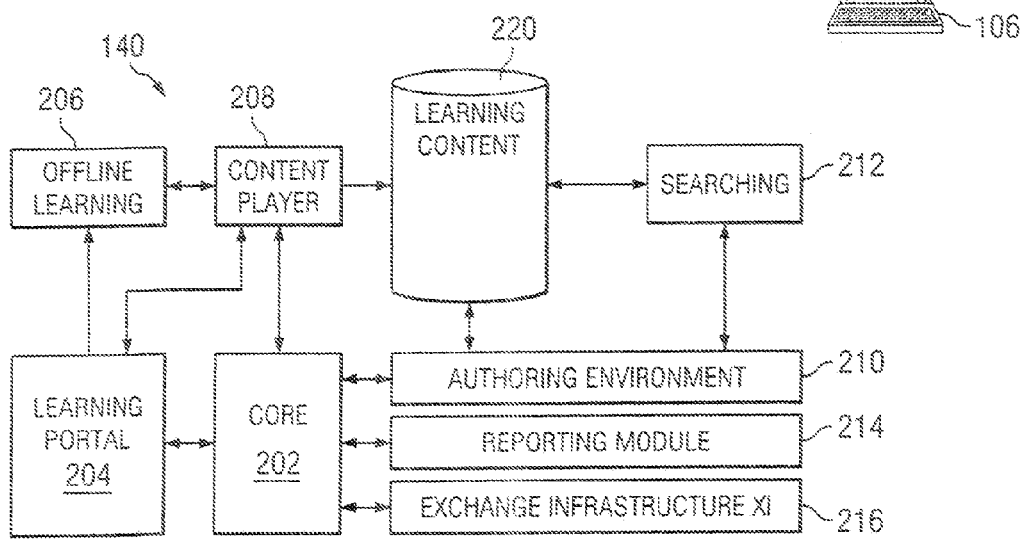
FIG. 2 illustrates an example architecture of a learning management system implemented within the learning environment of FIG. 1.

FIG. 2 illustrates one example implementation of learning management system (LMS) 140. In the illustrated embodiment, LMS 140 comprises four example components, namely i) a management system core 202, which controls learning processes and manages and handles the administrative side of training; ii) a learning portal 204, which is the learner's springboard into the learning environment, which allows him to access the course offering and information on personal learning data and learning activities; iii) an authoring environment 210, where learning content and tests are designed and structured; and iv) a content management system 220, where learning content is stored and managed. Generally, LMS 140 is aimed at learners 104, trainers 105, course authors 106 and instructional designers, administrators, and managers.

Learners 104 log on to their personalized learning portal 204 from any suitable client via GUI 116. The learning portal 204 is the user's personalized point of access to the learning-related functions. Generally, learning portal 204 presents details of the complete education and training offering, such as traditional classroom training, e-learning courses (such as virtual classroom sessions or web-based training), or extensive curricula. Self-service applications enable learners 104 to enroll themselves for courses, prebook for classroom courses, and cancel bookings for delivery methods, as well as start self-paced learning units directly. If learner 104 wants to continue learning offline, he can often download the courses onto the client and synchronize the learning progress later. The learning portal 204 may be seamlessly integrated in an enterprise portal, where learner 104 is provided with access to a wide range of functions via one system. Such an enterprise portal may be the learner's single point of entry and may integrate a large number of role-based functions, which are presented to the user in a clear, intuitive structure. The learning portal 204 often gives learner 104 access to functions such as, for example, search for courses using i) find functions: finding courses in the course catalog that have keywords in the course title or description; and ii) extended search functions: using the attributes appended to courses, such as target group, prerequisites, qualifications imparted, or delivery method. Additional functions may include self-service applications for booking courses and canceling bookings, messages and notes, course appraisals, and special (or personalized) course offering including courses prescribed for the learner 104 on the basis of his or her role in the enterprise or the wishes of the respective supervisor or trainer and qualification deficits of learner 104 that can be reduced or eliminated by participating in the relevant courses. The learning portal 204 may also provide a view of current and planned training activities, as well as access to courses booked, including: i) starting a course; ii) reentering an interrupted course; iii) downloading a course and continuing learning offline; iv) going online again with a downloaded course and synchronizing the learning progress; v) exiting a course; and vi) taking a test.

On the basis of the information the learning management system 140 has about learner 104, the learning management system core 202 proposes learning units for the learner 104, monitors the learner's progress, and coordinates the learner's personal learning process. In addition, the learning management system core 202 is often responsible for managing and handling the administrative processes. Targeted knowledge transfer may use precise matching of the learning objectives and qualifications of a learning unit with the learner's level of knowledge. For example, at the start of a course, the management system core 202 may compare learning objectives already attained by the respective learner 104 with the learning objectives of the course. On the basis of this, core 202 determines the learner's current level and the required content and scope of the course. The resulting course is then presented to the learner 104 via a content player 208.

The content player 208 is a virtual teacher that tailors learning content to the needs of the individual learner 104 and helps him navigate through the course; content player 208 then presents the learning course to the learner 104. In certain embodiments, the content player 208 is a Java application that is deployed on a Java runtime environment, such as J2EE. In this case, it is linked with other systems such as a web application server and ERP solution 135 via the Java Connector. The individual course navigation may be set up at runtime on the basis of the learning strategy stored in the learner account. Using the didactical strategies, content player 208 helps ensure that the course is dynamically adapted to the individual learning situation and the preferences expressed by learner 104. At this point, the content player 208 then calculates dynamically adjusted learning paths and presents these to the learner 104—perhaps graphically—to facilitate orientation within a complex subject area. The learner 104 can resume working on an interrupted course at any time. At this point, the content player 208 guides the learner 104 to the spot at which training was interrupted.

Offline learning player 206 generally enables learners 104 to download network or other web-based courses from the learning portal 204 and play them locally. Locally stored courses are listed in the course list with an icon indicating the status of each course. The offline player 206 may guide the learner 104 through the course according to the preferred learning strategy. It may also dynamically adjust the number and sequence of learning objects to the learner's individual learning pattern. If the learner 104 interrupts a course, the offline player 206 reenters the course at the point of interruption the next time. The learner 104 can, at any point in time, resynchronize his offline learning progress with the learning portal 204 and either continue learning online or set the course to a completed status.

LMS core 202 may also include or invoke training management that would be an administrative side of LMS 140. This typically includes course planning and execution, booking and cancellation of course participation, and follow-up processing, including cost settlement. In training management, the training administrator 105 creates the course offering and can, for example, define training measures for individual learners 104 and groups of learners 104. The training administrator 105 creates the course catalog in training management and makes it available (partially or completely) to learners 104 in the learning portal 204 for reference and enrollment purposes. The training administrator 105 can typically administer internal and external participants and enroll them for courses to be delivered using various technologies and techniques. Training management supports numerous business processes involved in the organization, management, and handling of training. Training management can be configured to meet the requirements, work processes, and delivery methods common in the enterprise. Training measures are usually flexibly structured and may include briefings, seminars, workshops, virtual classroom sessions, web-based trainings, external web-based trainings, static web courses, or curricula. Training management includes functions to efficiently create the course offerings. Using course groups to categorize topics by subject area enables flexible structuring of the course catalog. For example, when training administrator 105 creates a new subject area represented by a course group, he can decide whether it should be accessible to learners 104 in the learning portal 202.

Reporting functions 214 in training management enable managers to keep track of learners' learning activities and the associated costs at all times. Supervisors or managers can monitor and steer the learning processes of their employees. They can be notified when their employees request participation or cancellation in courses and can approve or reject these requests. LMS 140 may provide the training manager with extensive support for the planning, organization, and controlling of corporate education and training. Trainers need to have up-to-the-minute, reliable information about their course schedules. There is a wide range of reporting options available in training management to enable the trainer to keep track of participants, rooms, course locations, and so on.

Authoring environment 210 contains tools and wizards that content developers 106 and instructional designers can use to create or import external course content. External authoring tools can be launched directly via authoring environment 210 to create learning content that can be integrated into learning objects and combined to create complete courses (learning nets). Attributes may be appended to content, thereby allowing learners 104 to structure learning content more flexibly depending on the learning strategy they prefer. Customizable and flexible views allow subject matter experts and instructional designers to configure. and personalize the authoring environment 210. To create the HTML pages for the content, the user can easily and seamlessly integrate editors from external providers or other content providers 108 into LMS 140 and launch the editors directly from authoring environment 210. Authoring environment 210 often includes a number of tools for creating, structuring, and publishing course content and tests to facilitate and optimize the work of instructional designers, subject matter experts, and training administrators 105. Authoring environment 210 may contain any number of components or sub-modules such as an instructional design editor is used by instructional designers and subject matter experts to create and structure learning content (learning nets and learning objects), a test author is used by instructional designers and subject matter experts to create web-based tests, and a repository explorer is for training administrators and instructional designers to manage content.

In the illustrated embodiment, course content is stored and managed in content management system 220. Put another way, LMS 140 typically uses the content management system 220 as its content storage location. But a WebDAV (Web-based Distributed Authoring and Versioning) interface (or other HTTP extension) allows integration of other WebDAV-enabled storage facilities as well without departing from the scope of this disclosure. Content authors or developers 106 publish content in the back-end training management system. Links to this content assist the training administrator 105 in retrieving suitable course content when planning web-based courses. A training management component of LMS 140 may help the training administrator 105 plan and create the course offering; manage participation, resources, and courses; and perform reporting. When planning e-learning courses, the training administrator 105 uses references inserted in published courses to retrieve the appropriate content in the content management system for the courses being planned. Content management system 220 may also include or implement content conversion, import, and export functions, allowing easy integration of Sharable Content Object Reference Model (SCORM)-compliant courses from external providers or other content providers 108. Customers can create and save their own templates for the various learning elements (learning objects, tests, and so on) that define structural and content-related specifications. These provide authors with valuable methodological and didactical support.

Figure 3:
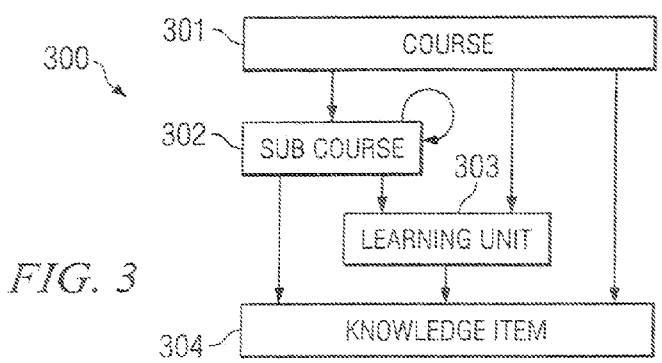
FIG. 3 illustrates an example content aggregation model in the learning management system.

LMS 140 and its implemented methodology typically structure content so that the content is reusable and flexible. For example, the content structure allows the creator of a course to reuse existing content to create new or additional courses. In addition, the content structure provides flexible content delivery that may be adapted to the learning styles of different learners. E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 3, course material 300 may be divided into four structural elements: a course 301, a sub-course 302, a learning unit 303, and a knowledge item 304.

Starting from the lowest level, knowledge items 304 are the basis for the other structural elements and are the building blocks of the course content structure. Each knowledge item 304 may include content that illustrates, explains, practices, or tests an aspect of a thematic area or topic. Knowledge items 304 typically are small in size (i.e., of short duration, e.g., approximately five minutes or less). Any number of attributes may be used to describe a particular knowledge item 304 such as, for example, a name, a type of media, and a type of knowledge. The name may be used by a learning system to identify and locate the content associated with a knowledge item 304. The type of media describes the form of the content that is associated with the knowledge item 304. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test.

Knowledge item 304 also may be described by the attribute of knowledge type. For example, knowledge types include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Each of the knowledge types are described in further detail below.

Knowledge items 304 may be generated using a wide range of technologies, often allowing a browser (including plug-in applications) to be able to interpret and display the appropriate file formats associated with each knowledge item. For example, markup languages (such as HTML, a standard generalized markup language (SGML), a dynamic HTML (DHTML), or XML), JavaScript (a client-side scripting language), and/or Flash may be used to create knowledge items 304. HTML may be used to describe the logical elements and presentation of a document, such as, for example, text, headings, paragraphs, lists, tables, or image references. Flash may be used as a file format for Flash movies and as a plug-in for playing Flash files in a browser. For example, Flash movies using vector and bitmap graphics, animations, transparencies, transitions, MP3 audio files, input forms, and interactions may be used. In addition, Flash allows a pixel-precise positioning of graphical elements to generate impressive and interactive applications for presentation of course material to a learner.

Learning units 303 may be assembled using one or more knowledge items 304 to represent, for example, a distinct, thematically-coherent unit. Consequently, learning units 303 may be considered containers for knowledge items 304 of the same topic. Learning units 303 also may be considered relatively small in size (i.e., duration) though larger than a knowledge item 304.

Sub-courses 302 may be assembled using other sub-courses 302, learning units 303, and/or knowledge items 304. The sub-course 302 may be used to split up an extensive course into several smaller subordinate courses. Sub-courses 302 may be used to build an arbitrarily deep nested structure by referring to other sub-courses 302.

Courses may be assembled from all of the subordinate structural elements including sub-courses 302, learning units 303, and knowledge items 304. To foster maximum reuse, all structural elements should be self-contained and context free.

Structural elements also may be tagged with metadata that is used to support adaptive delivery, reusability, and search/retrieval of content associated with the structural elements. For example, learning object metadata (LOM), per maps defined by the IEEE "Learning Object Metadata Working Group," may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 4:
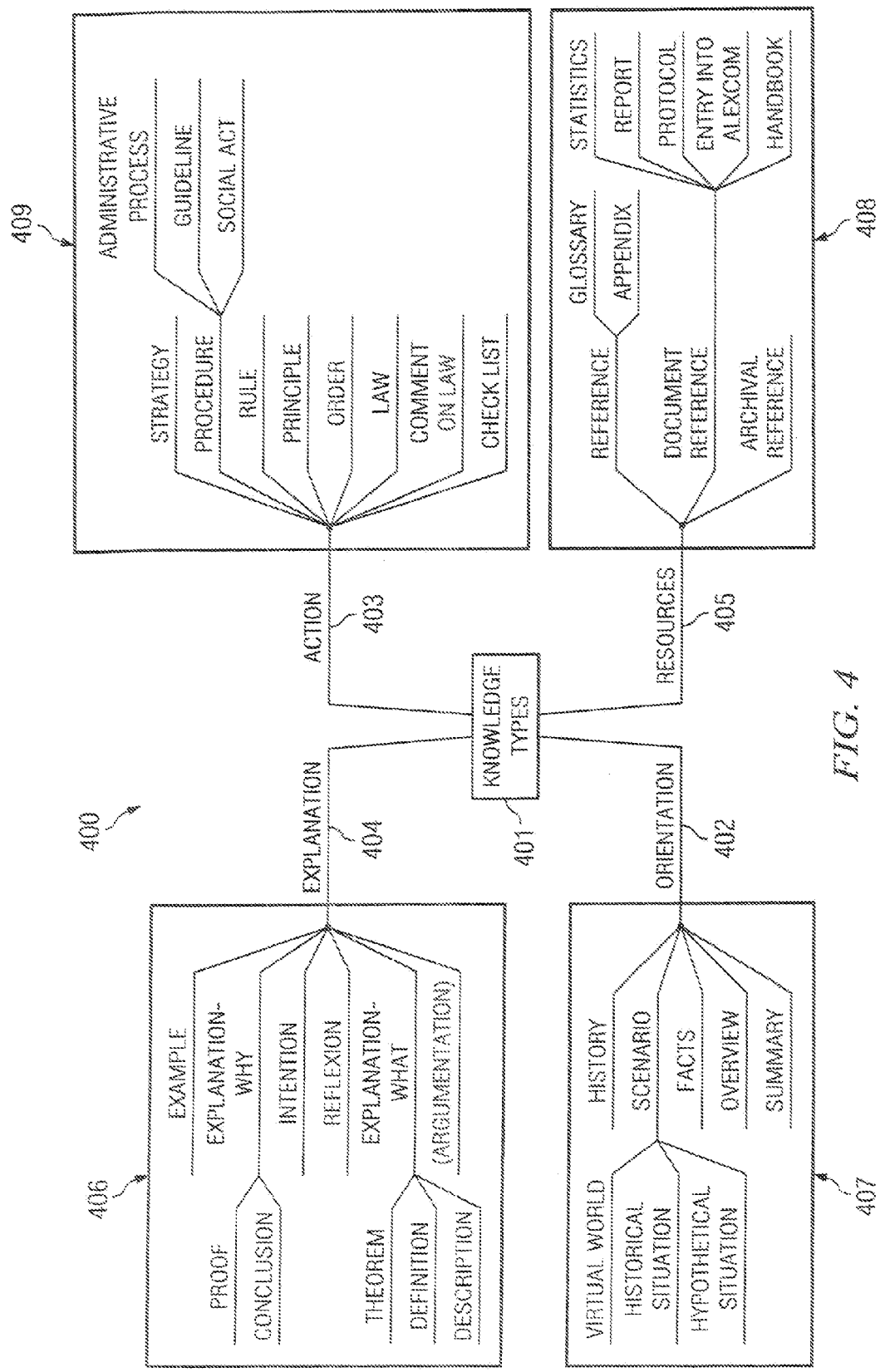
FIG. 4 is an example of one possible ontology of knowledge types used in the learning management system.

As shown in FIG. 4, structural elements may be categorized using a didactical ontology 400 of knowledge types 401 that includes orientation knowledge 402, action knowledge 403, explanation knowledge 404, and resource knowledge 405. Orientation knowledge 402 helps a learner 104 to find their way through a topic without being able to act in a topic-specific manner and may be referred to as "know what." Action knowledge 403 helps a learner to acquire topic related skills and may be referred to as "know how." Explanation knowledge 404 provides a learner with an explanation of why something is the way it is and may be referred to as "know why." Resource knowledge 405 teaches a learner where to find additional information on a specific topic and may be referred to as "know where."

The four knowledge types (orientation, action, explanation, and reference) may be further divided into a fine grained ontology. For example, orientation knowledge 402 may refer to sub-types 407 that include a history, a scenario, a fact, an overview, and a summary. Action knowledge 403 may refer to sub-types 409 that include a strategy, a procedure, a rule, a principle, an order, a law, a comment on law, and a checklist. Explanation knowledge 404 may refer to sub-types 406 that include an example, an intention, a reflection, an explanation of why or what, and an argumentation. Resource knowledge 405 may refer to sub-types 408 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed. Relations may be divided into two categories: subject-taxonomic and non-subject taxonomic.

Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B" describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of," "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 304 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 302 or a learning unit 303. The competencies may be used to indicate and evaluate the performance of a learner as learner 104 traverses the course material. A competency may be classified as a cognitive skill, an emotional skill, a senso-motorical skill, or a social skill.

As generally described earlier, a wizard is an interactive software application that presents a task or process to the particular user as a sequence of logical steps. The sequence of steps is linear from the user's perspective but may actually involving branching. Generally speaking, all possible sequences of wizard steps can be logically represented as a directed graph where vertices in the graph represent all possible steps and edges between the vertices represent all possible paths through the vertices. In one embodiment, the graph can be traversed in a step-wise fashion based on current state information which may include user input. For example, if a user responds to a given step by selecting a "default installation" button instead of a "custom installation" button in a step GUI, the next step will be chosen based upon user's selection. A step can be interactive meaning the step requires some sort of user input (whether optional or mandatory) or non-interactive (i.e., a processing step). Each step typically, but not necessarily, has an associated GUI which is presented by the wizard GUI.

The wizard can be implemented as one or more processes/threads executing on one or more computing devices or clients connected by one or more networks 114 or other suitable communication means (e.g., a shared memory or an interprocessor network). As described above in terms of GUI 116, the wizard's GUI can be provided on a display device that is not directly connected to the client upon which the non-GUI portion(s) of the wizard are executing.

Figure 5:
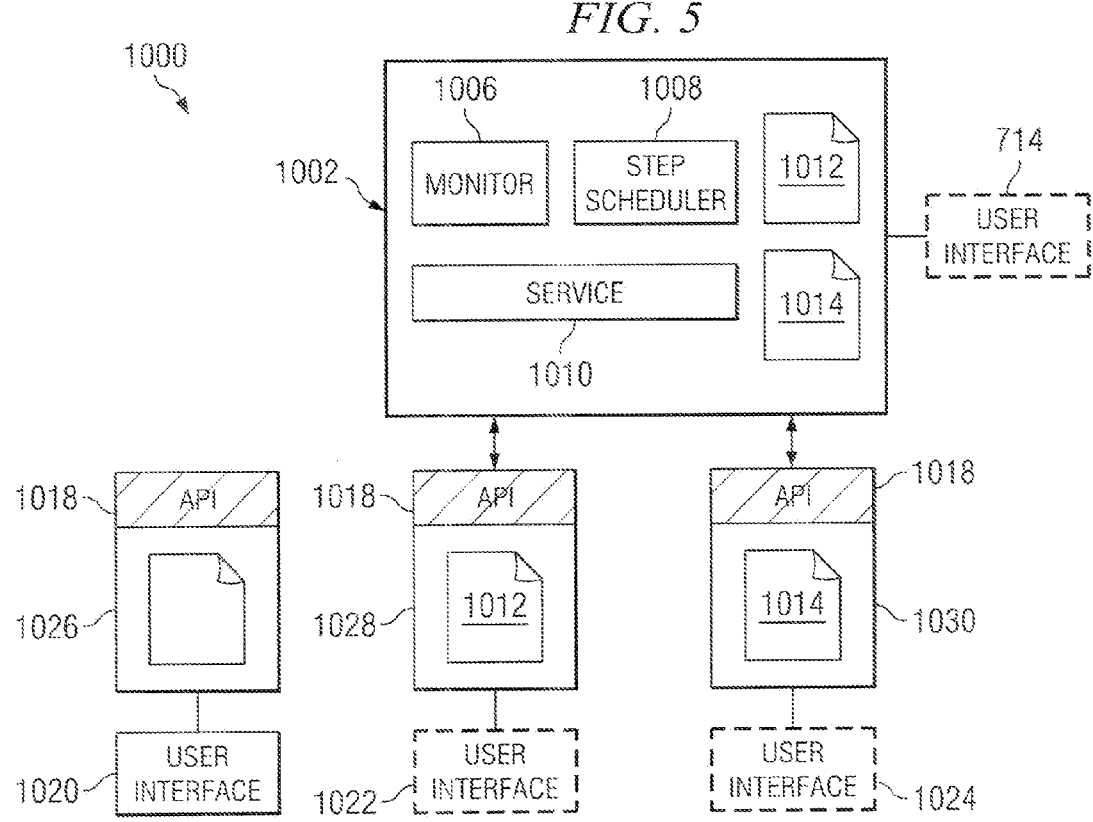
FIG. 5 illustrates a batch processing system.

FIG. 5 illustrates a batch processing system 1000 that may be implemented client-side of learning management system 140. Although this figure depicts logical components without reference to underlying computing devices, components can execute on one or more computing devices or clients. The system 1000 as illustrated includes a batch job manager 1002 and three wizards (1026, 1028, 1030). The batch job manager 1002 has a GUI 714, described in more detail below, which it can optionally present to the user depending on the circumstances. In one embodiment, each wizard can utilize an application programming interface (API) 1018 which is a programmatic interface and/or protocol that allows a wizard and the batch job manager 1002 (through a service component 1010) to communicate with each other. Particular implementations can realize one or more of the following advantages. Users can perform other tasks without having to wait for a lengthy wizard step to complete. Multiple wizard processes can be executed in batch mode simultaneously. A scheduler can ensure that wizard processes executing in batch mode do not overwhelm a system's resources. A user can specify that wizard steps requiring optional user input and/or confirmations do not interrupt a wizard process executing in batch mode. Wizard processes executing in batch mode can leave batch mode and revert to interactive mode when user input is required.

An API may be implemented in any suitable way including, but not limited to, instantiated class object(s), function (s), procedure(s), subroutine(s), as a web service, as a proxy, and other suitable implementations without departing from the scope of this disclosure. Although API 1018 is depicted logically as adjoining the wizard, API 1018 is not constrained to reside in the same process space or computing device as a wizard. The API 118 can communicate with the service component 1010 in a synchronous or asynchronous fashion using any number of means including, but not limited to, shared memory, distributed object(s), remote procedure calls, remote method invocation, signals, data communication protocol(s) such as, but not limited to, IP, User Datagram Protocol (UDP), TCP, and higher-level protocols such as, but not limited to, HTTP and Simple Object Access Protocol (SOAP).

In one embodiment, API 1018 allows the wizard to transition from interactive mode to batch mode. In this illustration, wizard 1026 is operating in interactive mode and wizards 1028 and 1030 are in batch mode, having turned over control of their respective step execution to batch job manager 1002 as a result of, for example, the user selecting the "as batch job" button 614 on the wizard GUI, as described below. In one embodiment, turning over control of step execution to the batch job manager 1002 results in the batch job manger 1002 obtaining information pertaining to the current state of the step-by-step process associated with the wizard (i.e., the identity of the last step executed and any other relevant state information) and information 1012 and 1014 associated with a wizard's steps (e.g., step type, resources). This information can be provided through the API 1018 or obtained from other means (e.g., through a repository, a service, a file).

Although each wizard typically has an associated GUI (1020, 1022, 1024), the GUI may not be presented if the wizard is in batch mode. For example, wizard 1026 is in interactive mode and usually presents its GUI 1020 whereas the GUI for wizards 1028 and 1030 may not be presented if the currently executing step for a wizard is a "processing" type step, for example. In one embodiment, a wizard GUI for the wizard in batch mode is altered to include batch mode controls (804, 806, 808 and 810). These controls invoke the API 1018 to communicate user preferences and other information back to batch job manager 1002.

Batch job manager 1002 may also include a step scheduler component 1008 for scheduling the sequential and/or parallel execution of wizard steps for wizards in batch mode (1028, 1030). The step scheduler component 1008 can schedule steps that do not need to be interrupted to obtain user input to execute on one or more computing devices connected by one or more networks or other suitable means (e.g., a step may execute on more than one processing device). By way of a non-limiting example, a step can execute as one or more processes, threads, or other suitable units of execution. In one embodiment, the wizard executes a given step under direction of the batch job manager 1002. In another embodiment, the batch job manger 1002 executes a given step without having to rely on a wizard. For each wizard in batch mode (1028, 1030), information 1012 and 1014 associated with the wizard's steps can be provided to or obtained by the batch job manager 1002. This information can be used by the step scheduler component 1008 to schedule steps for execution.

A monitor component 1006 keeps track of at least a subset of the steps under the control of the batch job manager 1002 on behalf of scheduler 1008. A step has an associated status which indicates if the step is waiting to execute, is executing, is waiting for input, has completed, or has experienced a fatal or non-fatal error. As described in more detail in FIG. 8, status information of the current step can be provided in the status column 716 of the batch job manager GUI 714. The monitor component 1006 can update a step's status information as the step progresses through different states (i.e., waiting to execute, executing, etc.). For example, if a step has received necessary user input, the monitor component 1006 can change the step's status from "waiting for input" to "waiting to execute." This serves to signal the step scheduler 1008 to schedule the step for execution. Further, if the wizard GUI needs to be presented to the user, the monitor component 1006 can cause its presentation. In one embodiment, wizard steps executing on more than one computing device can be overseen by remote monitor components or agents that report back to the monitory component 1006.

Figure 6:
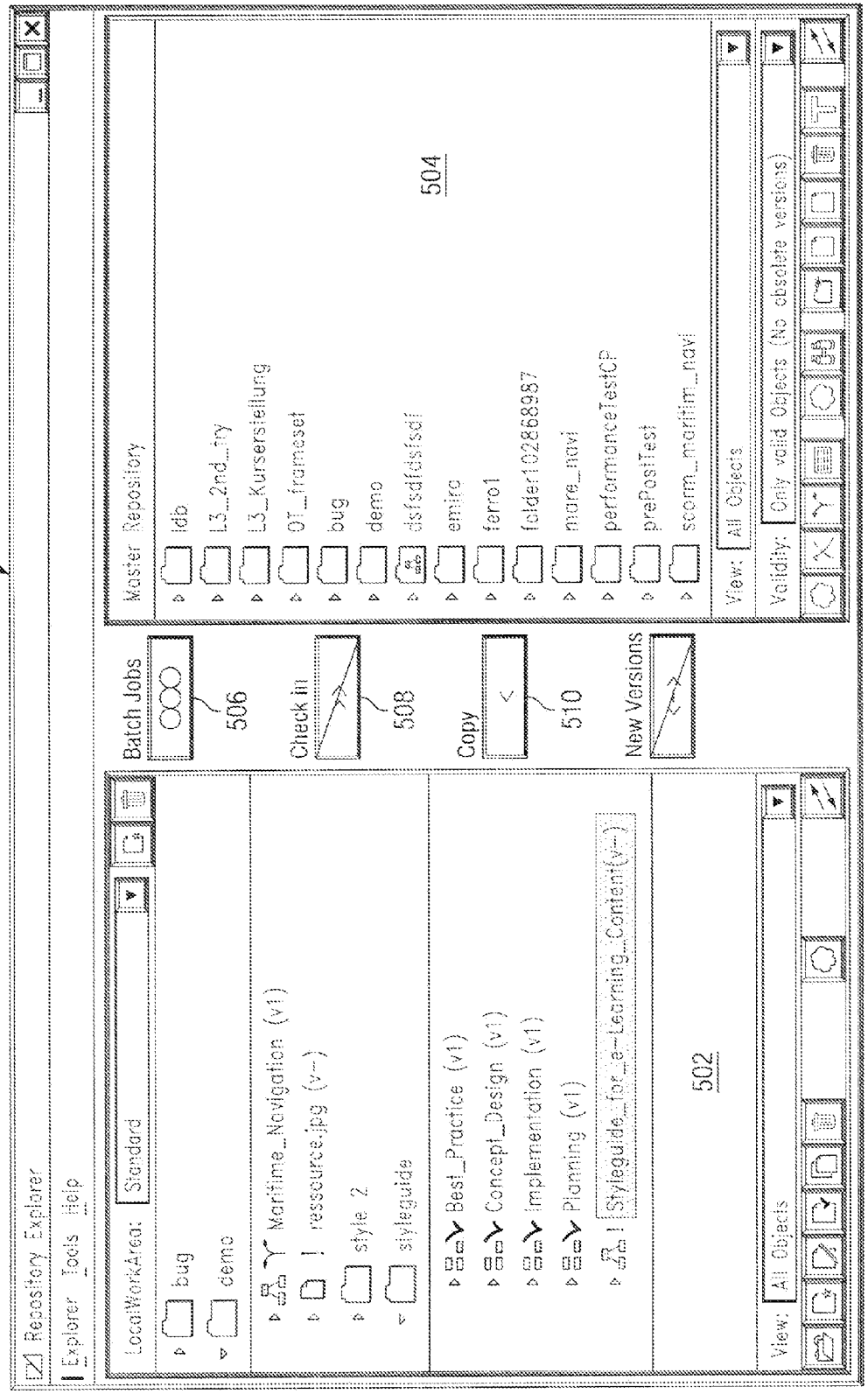
FIG. 6 is a screen shot of a graphical user interface for a repository explorer.

FIG. 6 is a screen shot of a GUI 500 for a repository explorer. As discussed above, authoring environment 210 may contain any number of components or sub-modules such as the repository explorer for training administrators 105 and instructional designers 106 to manage content. The repository explorer is a tool for the central administration of course content. One of its functions is to transfer data between a local repository (represented in display region 502) and a master repository (represented in display region 504). The local repository is where course content can be displayed and edited and the master repository is a central storage location accessible to all authors. A check-in button 508 allows the user to commence data transfer from the local repository to the master repository.

Figure 7:
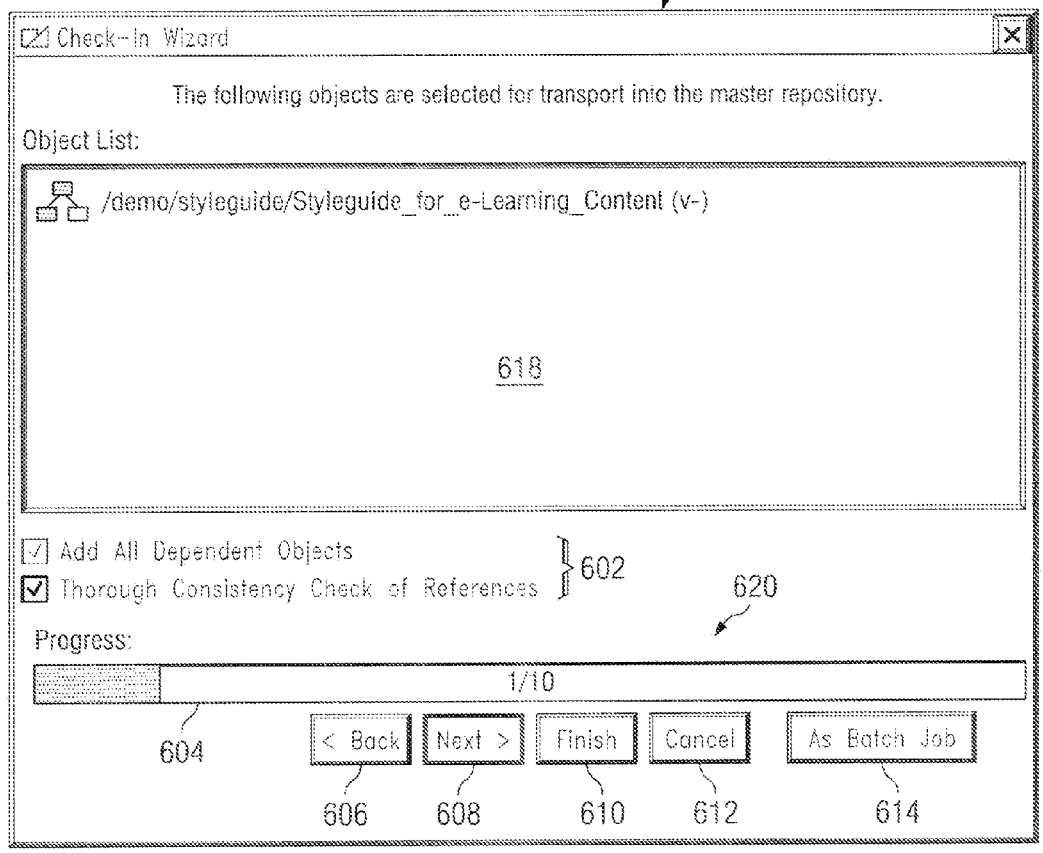
FIG. 7 is a screen shot of a graphical user interface for a check-in wizard.

The selection of the check-in button 508 causes a check-in wizard GUI to be presented as shown by FIG. 7. The check-in wizard allows the author to add dependent objects to the check-in list. Dependent objects are generally objects required for displaying the object being checked in. The check-in wizard provides a consistency check on cross-references between objects and their dependencies. A copy button 510 allows the user to transfer data from the master repository to the local repository. In this process, an author can update the copied object in the local repository and then check it back in the master repository. A "batch jobs" button 506 causes a batch job manager GUI to be presented (as described above).

FIG. 7 is a screen shot of a GUI 600 for the check-in wizard. Although illustrations are given for a particular check-in wizard, this disclosure is not limited to any particular type of wizard. The example check-in wizard includes a check-in list displayed in pane 618 that lists the objects to be checked into the master repository. The wizard progress bar 604 indicates to the user what the current step is and how many steps there are in total 620. In this illustration, the current step is one out of ten total steps. Some steps, such as the current one, are associated with user input whereas others may not. In the current step, the user can select various processing options 602 related to the check-in procedure. The user can select a next button 608 to advance the wizard to the next step. Alternatively, if this was not the first step, the user could select a back button 606 to go back one step. If this was the last step, then selection of the finish button 610 would complete the process and close the wizard. A cancel button 612 allows the user to cancel the operation of the wizard. Finally, the user may choose to put the wizard in batch processing mode by selecting batch job button 614. Batch processing mode causes control of the wizard to be transferred to a batch job manager. This can also entail hiding GUI 600 and presenting a GUI 700 for the batch job manager, which may be any local or distributed software.

Figure 8:
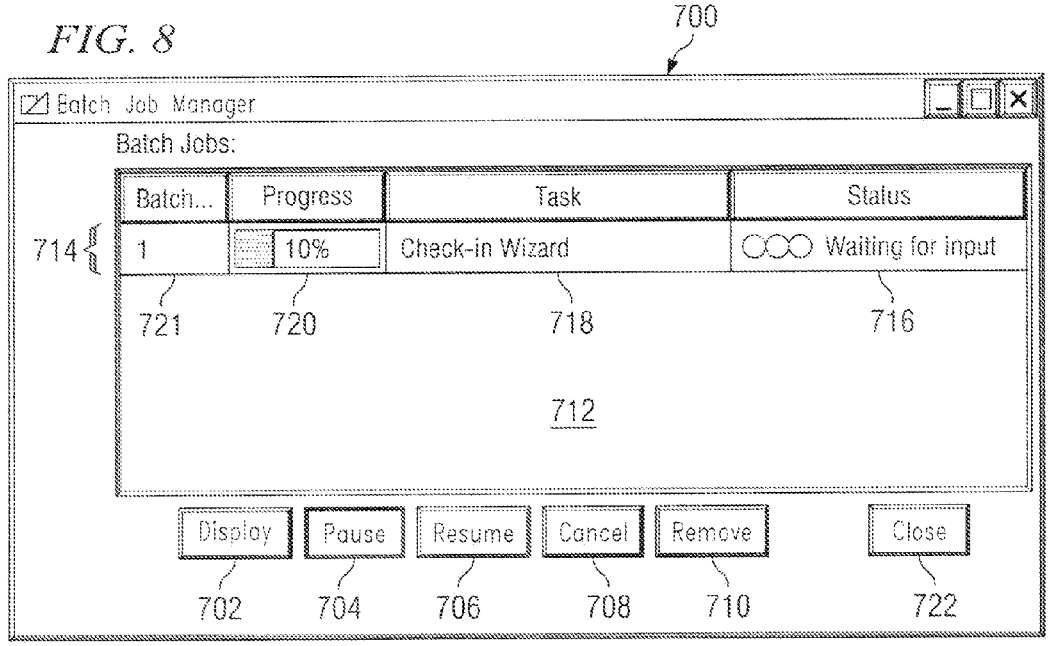
FIG. 8 is a screen shot of a graphical user interface for a batch job manager.

FIG. 8 is a screen shot of the GUI 700 for the batch job manager. The batch job manager can be implemented as one or more processes/threads executing on the particular client. Typically, the batch job manager controls the execution of one or more wizards. Display region 712 is used to list wizards operating under the batch job manager's control. In one embodiment, the display region 712 can show the following information for each wizard: a batch job number 721, a progress bar 720 indicating how far the wizard has progressed, a task name for the wizard 718, and a status 716 indicating whether the wizard is running or stopped due to an error or in order to obtain user input.

In one embodiment, the batch job manager can executed wizards sequentially, in order of the batch job number 721, for example. By way of illustration, the batch job number 721 can represent the order in time when a wizard was put into batch mode. Alternatively, wizards can be executed sequentially according to any factor such as (but not limited to) job priority, a user priority, an implicit or explicit ordering of the wizards, or any other suitable criteria. In another embodiment, the batch job manger can cause the execution of one or more wizards' steps in parallel, for example, if those wizards' steps would not conflict with each other. For example, the wizard's steps can have associated resource information (e.g., metadata) which can be used by the batch job manager to determine if a resource conflict would arise between two or more wizards.

Resource information can include information pertaining to operating system resources required by the step such as processing time, memory, registries, file systems, network bandwidth, and application resources such as web services and databases. The batch job manager can dynamically determine if a given resource required by two or more wizards' steps at the same time would be able to accommodate the simultaneous usage. In one embodiment, the batch job manager can refer to policies that determine acceptable usage ranges or maximum usage limits for resources. By way of illustration, the batch job manager can determine how currently executing steps are taxing a given resource and prevent further execution of steps that require that resource until the usage is within an acceptable range or below a given limit. A step can also have information associated with it that indicates the step cannot be executed in parallel with any other step on a given system or domain. The batch control manager can accommodate this by scheduling steps such that none are executing in parallel with this type of step. In a further embodiment, the batch control manager can give priority to the steps of wizards that have been in existence or waiting the longest.

Referring again to FIG. 8, the batch process manager GUI 700 allows a user to select one or more wizards in display region 712 and then perform an action by selecting a button (702, 704, 706, 708, 710, and 722). A display button 702 causes the GUI of the selected wizards to be displayed. For example, as illustrated here, when the wizard has stopped because a wizard step requires user input, the user can open the wizard and provide the necessary input. The user can then put the wizard back into batch mode. The user can also pause a wizard from executing further by selecting a pause button 704. The pause can bring to a halt a currently executing step or wait for the currently executing step to finish before pausing the wizard. Likewise, a resume button 706 can be used to resume execution of the wizard under the control of the batch process manager. The wizard can be canceled such that it terminates by selection of a cancel button 708. A remove button 710 allows the user to remove a completed task from display region 712. A close button dismisses the batch job manager GUI 700. In one embodiment, the GUI 700 can be presented automatically when a user puts the wizard in batch mode.

Figure 9:
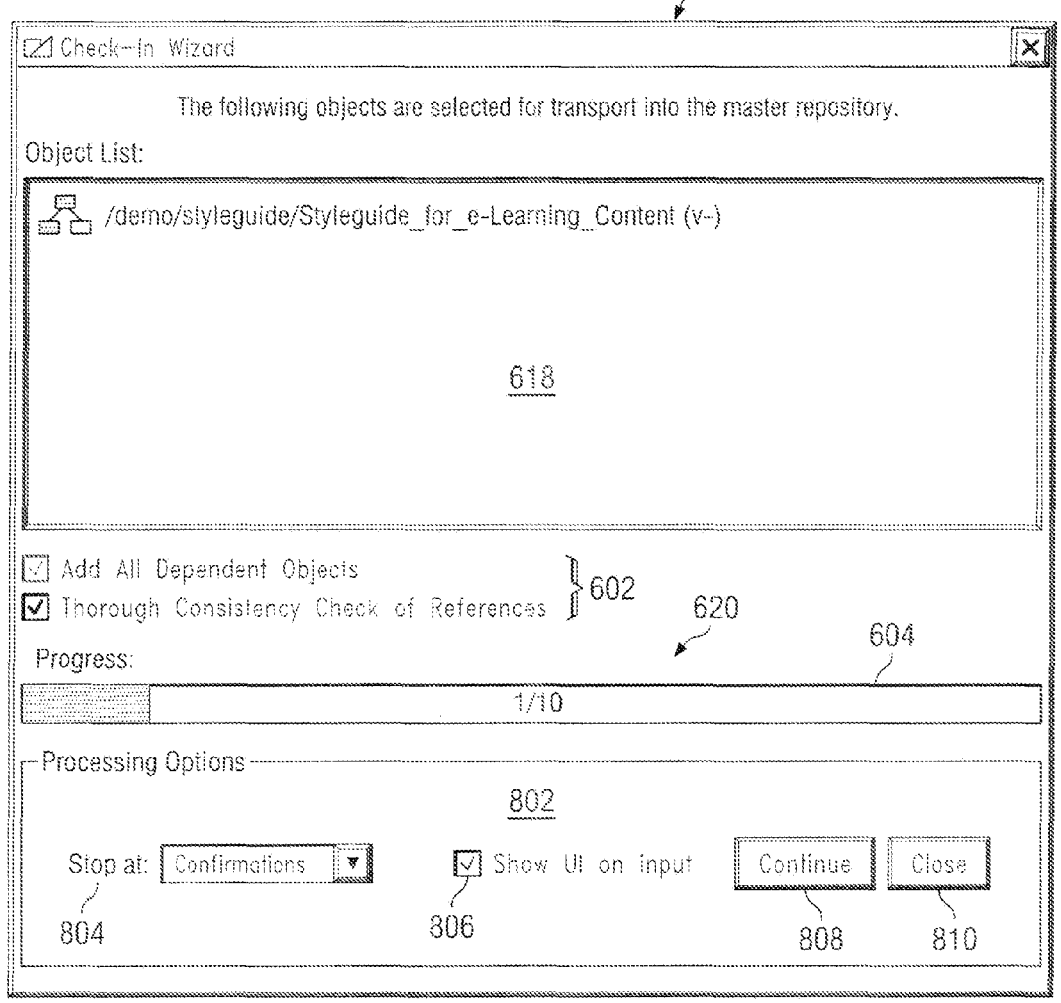
FIG. 9 is a screen shot of a graphical user interface for the check-in wizard as augmented for batch processing.

FIG. 9 is a screen shot of a GUI 800 for the check-in wizard which has been dynamically augmented for batch processing. GUI 800 can be displayed manually by selecting the wizard 714 in the batch job manager GUI 700 and then the display button 702, or the GUI 800 can be displayed automatically by the batch job manager when a step requires user input (as below). The progress bar 604 displays the current step as before. Likewise, the other wizard GUI elements for the current step may be present, but the back, next, finish, cancel and batch buttons (i.e., 606, 608, 610, 612 and 614) have been replaced by display region 802 that includes batch processing controls. In one embodiment, these include a "stop at" menu 804, a "show UI on input" check box 806, a continue button 808, and a close button 810.

The "stop at" menu 804 allows a user to select a menu item that will dictate when the batch processing manager will interrupt a given wizard executing in batch mode to obtain user input. In one embodiment, a step has an associated step type which defines whether the step requires user input. The step type can be assigned to a step before execution of the wizard or dynamically during execution. Although TABLE 1 illustrates four possible step types, many other step types (including more or fewer types) are possible without departing from the scope and spirit of this disclosure. For example, the "processing" step type could be subdivided into step types that define the type of processing or the type of resource required (as above). Similarly, the input step types could be further subdivided to indicate if a step could possibly receive mandatory user input from another source such as a file, a web service, a process, or any other suitable source.

TABLE 1

| STEP TYPE | DESCRIPTION |
| --- | --- |
| Processing | No user input required. |
| Confirmation | User confirmation of an action or a condition is optionally required. |
| Optional Input | User input is optionally required. |
| Mandatory Input | User input is mandatory. |

In one embodiment, a "processing" type step requires no user input and can run uninterrupted (assuming in one embodiment that there are no resource conflicts). The "confirmation" and "optional input" step types both specify that optional user input is indicated, but not required. The GUI associated with these steps can be automatically skipped if the user selects from the "stop at" menu 804 appropriately. In general, a step having a type of "mandatory input" cannot be usually skipped. In this example, the "confirmations" option has been selected. The "stop at" menu 804 options are presented in TABLE 2 below.

TABLE 2

| "STOP AT" MENU SELECTION | RESULT |
| --- | --- |
| Confirmations | Selection of this menu item means that the batch job manager will only interrupt this wizard's steps if the current step type is other than "processing". |
| Optional Input | Selection of this menu item means that the batch job manager will only interrupt this wizard's steps if the current step type is "mandatory input" or "optional input". |
| Mandatory Input | Selection of this menu item means that the batch job manager will only interrupt this wizard's steps if the current step type is "mandatory input". |

The "show UI on input" check box 806, if selected, will cause the wizard's (dynamically augmented) GUI to be presented to the user whenever a step is interrupted. If check box 806 is not selected, then the user can manually show the wizard's GUI using the display button 702 on the batch job manager GUI 700. The "continue" button 808 continues with the next step similar to the "next" button 608 in the un-augmented wizard GUI 600. In one embodiment, button 808 is only activated if the user has provided the required input. The close button 810 closes the GUI 800 and optionally causes the batch job manager GUI 700 to be presented.

In one embodiment, the batch job manager parameters presented in display region 802 can be obtained from a configuration file, a user profile or policy, a process, a web service or any other suitable means (whether static or dynamic). Alternatively, the parameters can be set automatically based on information regarding the step types and type of user input that is required.

Figure 10:
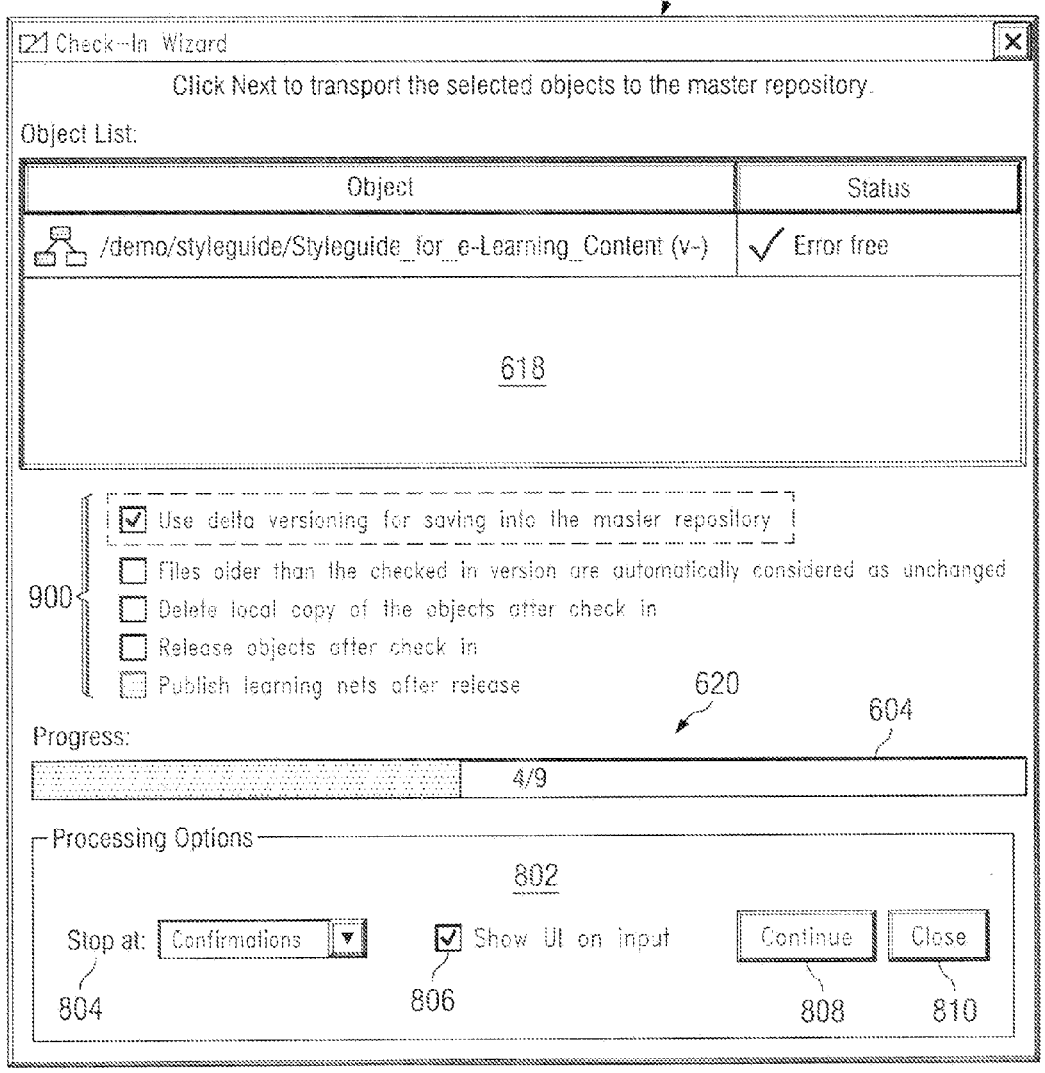
FIG. 10 is a screen shot of the augmented graphical user interface for the check-in wizard at a subsequent step.

FIG. 10 is another screen shot of the GUI 800 for the check-in wizard at a subsequent step (i.e., step 4), as shown by step indicator 620. The check-in wizard GUI was previously presented at step 1. In that step, the user selected the continue 808 button with the "stop at" menu option 804 set to "confirmations." For purposes of this illustration, assume that steps 2-3 were "processing" steps and as such were performed in batch mode under the direction of the batch job manger without requiring any user input. Upon reaching a step associated with certain user input (i.e., step 4 requiring user input), GUI 800 automatically presents since the "show UI on input" checkbox 806 had been selected in step 1. Notice that a new wizard input options 900 corresponding to step 4 may be presented in lieu of the user input options 602 corresponding to step 1.

Figure 11:
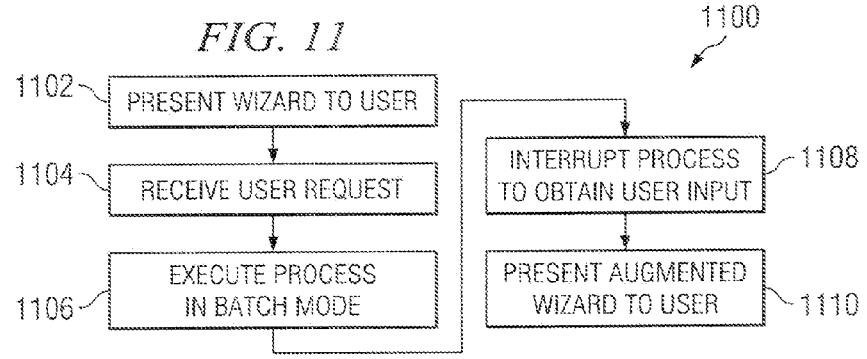
FIG. 11 is a flow diagram showing processing in accordance to various embodiments.

FIG. 11 is a flow diagram showing certain processing in accordance to various embodiments. A wizard GUI is presented to a user (step 1102) as shown for example in FIG. 7. The wizard receives a request to put the wizard in batch mode (step 1104). For example, the user can select the "as batch job" button 614. The step-by-step process associated with the wizard is then executed in batch mode (step 1106). In one embodiment, the wizard contacts the batch job manager 1002 through API 1018 to turn over control of step execution to the step scheduler component 1008. In one embodiment, the step scheduler 1008 determines on its own or by querying a wizard what next step should follow a completed step. If the step requires user input based on any suitable criteria, batch execution for the wizard halts (step 1108). A GUI corresponding to the step requiring the particular user input is presented to the user and augmented by the API to include batch controls as discussed above (step 1110).

The embodiments and all of the functional operations described in this specification can be implemented in digital electronic circuitry, or in computer hardware, firmware, software, or in combinations of them. Apparatus of the embodiments can be implemented in a computer program product tangibly embodied in a machine-readable storage device for execution by a programmable processor; and method steps of the embodiments can be performed by a programmable processor executing a program of instructions to perform functions of the embodiments by operating on input data and generating output.

A number of embodiments have been described. Nevertheless, it will be understood that various modifications may be made without departing from the spirit and scope of the disclosure. For example, the batch job manager may be implemented within one or more of the wizards. In another example, the batch job manager may run as a hidden process or server that monitors calls from wizards to execute a task as a batch process. Accordingly, other embodiments are within the scope of the following claims.

What is claimed is:

1. A computer-implemented method, comprising:
presenting a wizard to a user to perform a step-by-step process, each step associated with a step type, the step type being one of confirmation, processing, optional input, or mandatory input, wherein the wizard is capable of presenting a user interface associated with each step in the step-by-step process;
executing the wizard process as a batch process by a batch job manager based on a user's first request; and
interrupting the batch process based on an associated step type of a current step, the interruption determined by a comparison of the associated step type of the current step to a user parameter, wherein interrupting the batch process comprises:
presenting an augmented user interface associated with the current step incorporating at least one user interface element associated with the operations of the batch job manager configured to receive a user's second request; and
resuming execution of the batch process based on the user's second request.

2. The method of claim 1, where the user parameter identifies one or more step types that require interruption of the batch process.

3. The method of claim 2, where the interrupting of the batch process occurs if the step type of the current step is identified by the user parameter.

4. The method of claim 1, further comprising:
receiving a prompt; and
resuming execution of the batch process in response to the prompt.

5. The method of claim 1, where executing the process comprises selecting a step in the process and executing the step.

6. A computer-implemented method, comprising:
presenting a wizard to a user to perform a step-by-step process, each step associated with a step type, the step type indicating whether the step requires user input, the step type being one of confirmation, processing, optional input, or mandatory input, wherein the wizard is capable of presenting a user interface associated with each step in the step-by-step process;
executing the wizard process as a batch process by a batch job manager based on a user's first request; and
interrupting the batch process based on an associated step type of a current step when the step type indicates that user input is required, wherein interrupting the batch process comprises:
presenting an augmented user interface associated with the current step incorporating at least one user interface element associated with the operations of the batch job manager configured to receive a user's second request; and
resuming execution of the batch process based on the user's second request.

7. The method of claim 6, where the step type associated with a step is determined dynamically by the batch job manager based at least on information retrieved via an application programming interface associated with the wizard.

8. A computer-implemented method, comprising:
accepting control of a wizard based on a first user request, the wizard configured to perform a step-by-step process, each step associated with a step type, the step type being one of confirmation, processing, optional input, or mandatory input, wherein the wizard is capable of presenting a user interface associated with each step in the step-by-step process;
causing execution of the wizard process in batch mode by a batch job manager until a first step associated with a step type that requires user input is encountered;
presenting an augmented user interface of the wizard associated with the first step to the user, where the augmented user interface of the wizard incorporates at least one user interface element associated with the operations of the batch job manager configured to correspond to the first step, where completion of the first step is based at least in part on a second user request; and
resuming execution of the wizard process in batch mode after completion of the first step based on the second user request.

9. The method of claim 8, further comprising continuing execution of the wizard process in batch mode until a second step associated with a step type that requires user input is encountered.

10. The method of claim 8, where user interfaces associated with particular steps of the wizard are not presented while the process is executing in batch mode.

11. The method of claim 8, where accepting control of the wizard includes obtaining state information for the wizard.

12. The method of claim 8, where causing execution of the wizard process includes determining from the wizard process what the next step is.

13. Software stored in non-transitory computer readable media comprising machine-readable instructions, the instructions operable when executed to:
- present a wizard to a user to perform a step-by-step process, each step associated with a step type, the step type indicating whether the step requires user input, the step type being one of confirmation, processing, optional input, or mandatory input, wherein the wizard is capable of presenting a user interface associated with each step in the step-by-step process;
- execute the wizard process as a batch process by a batch job manager based on a user's first request; and
- interrupt the batch process based on an associated step type of a current step when the step type indicates that user input is required, wherein interrupting the batch process comprises:
- presenting an augmented user interface associated with the current step incorporating at least one user interface element associated with the operations of the batch job manager configured to receive a user's second request; and
- resuming execution of the batch process based on the user's second request.

14. The software of claim 13, where the step type associated with a step is determined dynamically by the batch job manager based at least on information retrieved via an application programming interface associated with the wizard.

* * * * *